US011044218B1

(12) United States Patent
Eng et al.

(10) Patent No.: US 11,044,218 B1
(45) Date of Patent: Jun. 22, 2021

(54) SYSTEMS AND METHODS FOR REACTING TO MESSAGES

(71) Applicant: Slack Technologies, Inc., San Francisco, CA (US)

(72) Inventors: Laura Eng, San Francisco, CA (US); Jesus A. Aguirre-Giron, San Francisco, CA (US); Chastine Grace Guy-Uyco De Leon, Dublin, CA (US); Kallie Sue Friedman, San Francisco, CA (US); Janelle Anne Figueroa Bautista, Richmond, CA (US); Shilpa Ramamurthy, San Francisco, CA (US); Carla Gonzales, San Francisco, CA (US); Shivani Sharma, San Francisco, CA (US); Jesse Ryan Bounds, San Francisco, CA (US); Benjamin Mark Powell, Vancouver (CA)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 17/079,226

(22) Filed: Oct. 23, 2020

(51) Int. Cl.
*H04L 12/58* (2006.01)

(52) U.S. Cl.
CPC .............. *H04L 51/10* (2013.01); *H04L 51/18* (2013.01); *H04L 51/22* (2013.01)

(58) Field of Classification Search
CPC ......... H04L 51/10; H04L 51/18; H04L 51/22; H04L 67/025; H04L 67/34; G06Q 10/10
See application file for complete search history.

(56) References Cited

U.S. PATENT DOCUMENTS

| 9,043,196 | B1* | 5/2015 | Leydon | H04M 1/72436 704/4 |
| 10,015,124 | B2* | 7/2018 | McGregor, Jr. | H04L 51/02 |
| 10,649,622 | B2* | 5/2020 | Yang | G06F 3/0362 |
| 2013/0159919 | A1* | 6/2013 | Leydon | G06F 3/04817 715/780 |

(Continued)

OTHER PUBLICATIONS

"How to change Discord quick reactions to different emoji?" located at reddit.com/r/discordapp/comments/f7e2u8/how_to_change_discord_quick_reactions_to/, retrieved on Mar. 8, 2021 (12 pages).

(Continued)

*Primary Examiner* — Sargon N Nano
(74) *Attorney, Agent, or Firm* — Morrison & Foerster LLP

(57) ABSTRACT

Provided are methods and systems for reacting to a message in a group-based communication system using suggested reactive emoji. An exemplary method comprises: displaying a message within an interface of a group-based communication platform; determining a set of suggested reactive emoji, wherein the set of suggested reactive emoji is determined based on at least one adjustable setting associated with at least one of a user identifier and a group identifier; receiving, from the user, an input associated with the message; and in response to receiving the input, displaying a menu of message-related actions in the interface, the menu of message-related actions comprising the set of suggested reactive emoji; receiving a user selection of a reactive emoji from set of suggested reactive emoji; and displaying the selected reactive emoji in association with the message within the interface.

20 Claims, 8 Drawing Sheets

(56) References Cited

U.S. PATENT DOCUMENTS

| | | | |
|---|---|---|---|
| 2017/0147185 A1* | 5/2017 | Milvaney | G06F 3/0482 |
| 2017/0185581 A1* | 6/2017 | Bojja | G06K 9/6269 |
| 2018/0287982 A1 | 10/2018 | Draeger et al. | |
| 2018/0356957 A1* | 12/2018 | Desjardins | G06F 40/279 |
| 2018/0373683 A1* | 12/2018 | Hullette | G06F 40/134 |
| 2019/0122403 A1* | 4/2019 | Woo | G06N 20/00 |
| 2019/0122412 A1* | 4/2019 | Woo | G06F 40/279 |
| 2019/0332247 A1* | 10/2019 | Liu | G06F 3/04817 |
| 2020/0036831 A1* | 1/2020 | Kim | H04L 51/043 |
| 2020/0110794 A1* | 4/2020 | Vos | G06F 40/166 |

OTHER PUBLICATIONS

"Remove quick reactions in the newest update," located support.discord.com/hc/en-us/community/posts/360056524231-Remove-quick-reactions-in-the-newest-update, retrieved on Mar. 8, 2021 (6 pages).

Giret, L. (Jun. 13, 2019). "Microsoft Teams users can now react to messages with 6 different emojis," located at onmsft.com/news/microsoft-teams-users-can-now-react-to-messages-with-6-different-emojis, visited on Mar. 8, 2021 (2 pages).

Keller et al. (Jul. 31, 2020) "How to use emoji and Tapbacks in Messages on iPhone and iPad," located at imore.com/how-use-emoji-and-tapbacks-imessage, visited on Mar. 8, 2021 (11 pages).

Wong, Q. (Apr. 11, 2019) "LinkedIn 'reactions' lets you express curiosity, love and other emotions," located at cnet.com/news/linkedin-reactions-lets-you-express-curiosity-love-and-other-emotions/, visited on Mar. 8, 2021 (3 pages).

"Reactions," located at discordapp.fandom.com/wiki/Reactions, visited on Mar. 8, 2021 (10 pages).

"Die, Email, Die! A Flickr Cofounder Aims to Cut Us All Some Slack", Readwriteweb, Lexisnexis, www.advance.lexis.com/api/permalink/33dd79e2-90f5-409d-ae27-5a2c7e86bf31/?context=1000516. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email", Atlantic Online, Lexisnexis, www.advance.lexis.com/api/permalink/32d7ddd9-d4c1-4a73-86t7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: www.slate.com/business/2014/05/stewart-putterfield-flickr-and-slack-how-he-snatched-victory-from-the-jaws-of-defeat.html. (dated May 28, 2014, 2:48 PM) 8 pages.

Ernie Smith, "Picking Up the Slack", Tedium, [online][retrieved May 9, 2019]. Retrieved from the Internet: www.tedium.co/2017/10/17/irc-vs-slack-chat-history/. (dated Oct. 17, 2017) 13 pages.

Internet Relay Chat, Wikipedia, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", Gigaom, Lexisnexis, www.advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, www.advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, Is Valued at $1.1 Billion", The New York Times Blogs (BITS), Lexisnexis, www.advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: www.rfc-editor.org/rfc/rfc1459.txt. (dated May 1993) 57 pages.

Rebecca Walberg, "Email biggest office waste of time: survey", National Post, at FP10, Lexisnexis, www.advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

\* cited by examiner

SYSTEMS AND METHODS FOR REACTING TO MESSAGES

FIELD OF THE INVENTION

The present disclosure relates generally to computer user interfaces, and more specifically, to systems and methods for suggesting reactive emoijs in a communication system.

BACKGROUND

A communication platform (e.g., messaging platform, email platform) can allow a user to react to a message using one or more emoji. For example, a group-based or channel-based communication system provides user interfaces for reacting to a message using emoji in addition to user interfaces for responding to the message. However, identifying and selecting emoji to react with can be a non-intuitive and cumbersome experience for the user. For example, the user may need to examine a large collection of emoji in order to identify the desired emoji. As another example, the user may need to enter multiple inputs to launch the appropriate emoji menu, scroll through the emoji menu, and select the desired emoji.

BRIEF SUMMARY

Provided herein are systems and methods for suggesting reactive emoji to a user that can be selected by the user to react to a message or other media in a group-based communication system. As described above, using emoji in a communication system can often be a non-intuitive and cumbersome process for many users. However, by suggesting to a user a select number of reactive emoji, the process of locating the emoji, identifying an emoji to appropriately react to a message, and selecting the emoji to react to the message can become more intuitive and less cumbersome. According to some embodiments, providing a select number of suggested emoji can encourage a user to more readily use an emoji to react to a message by reducing the number of emoji they need to choose from. This can help the user more easily find an appropriate emoji to use to react to a message.

According to some embodiments, a group administrator and/or a user can customize the specific reactive emoji that are suggested to a user. A user may desire to customize the set of suggested reactive emoji to reflect the reactive emoji that the user prefers. A group administrator may desire customize a set of suggested reactive emoji for the group to encourage usage of particular reactive emoji and/or to reflect a desired group dynamic. Thus, according to various embodiments, systems and methods of suggesting reactive emoji and customizing suggested reactive emoji described herein can help improve user engagement on the communication platform and encourage successful group collaboration amongst users on the communication platform.

In some embodiments, a computer-implemented method is provided, the method comprising: displaying a message within an interface of a group-based communication platform on a device associated with a user of the group-based communication platform; determining a set of suggested reactive emoji based on a group identifier and a user identifier, wherein the set of suggested reactive emoji is determined based on at least one adjustable setting associated with at least one of the user identifier and the group identifier; receiving, from the user, an input associated with the message; and in response to receiving the input, displaying a menu of message-related actions in the interface, the menu of message-related actions comprising: a first graphical object that is selectable for accessing a plurality of available reactive emoji, and the set of suggested reactive emoji; receiving a user selection of a reactive emoji from set of suggested reactive emoji; and displaying the selected reactive emoji in association with the message within the interface.

In some embodiments of the method, the at least one adjustable setting comprises at least one of a user-defined setting and a group administrator-defined setting.

In some embodiments of the method, the at least one adjustable setting comprises a user-defined setting and a group administrator-defined setting and the user-defined setting takes precedence over the administrator-defined setting.

In some embodiments of the method, the set of suggested reactive emoji is determined based on a history of usage of reactive emoji.

In some embodiments of the method, the history of usage of reactive emoji is a frequency of usage of reactive emoji.

In some embodiments of the method, the history of usage of reactive emoji is a total number of times the user has used a reactive emoji of any kind.

In some embodiments of the method, the at least one adjustable setting is set by at least one of a user-defined setting and a group administrator-defined setting via one or more user interfaces for a user or group administrator to select one or more of the set of suggested reactive emoji.

In some embodiments, provided is an electronic device associated with a user of a group-based communication platform, the device comprising: a display; one or more processors; a memory; and one or more programs, wherein the one or more programs are stored in the memory and configured to be executed by the one or more processors, the one or more programs including instructions for: displaying a message within an interface of a group-based communication platform on a device associated with a user of the group-based communication platform; determining a set of suggested reactive emoji based on a group identifier and a user identifier, wherein the set of suggested reactive emoji is determined based on at least one adjustable setting associated with at least one of the user identifier and the group identifier; receiving, from the user, an input associated with the message; and in response to receiving the input, displaying a menu of message-related actions in the interface, the menu of message-related actions comprising: a first graphical object that is selectable for accessing a plurality of available reactive emoji, and the set of suggested reactive emoji; receiving a user selection of a reactive emoji from set of suggested reactive emoji; and displaying the selected reactive emoji in association with the message within the interface.

In some embodiments of the device, the at least one adjustable setting comprises at least one of a user-defined setting and a group administrator-defined setting.

In some embodiments of the device, the at least one adjustable setting comprises a user-defined setting and a group administrator-defined setting and the user-defined setting takes precedence over the administrator-defined setting.

In some embodiments of the device, the set of suggested reactive emoji is determined based on a history of usage of reactive emoji.

In some embodiments of the device, the history of usage of reactive emoji is a frequency of usage of reactive emoji.

In some embodiments of the device, the history of usage of reactive emoji is a total number of times the user has used a reactive emoji of any kind.

In some embodiments of the device, the at least one adjustable setting is set by at least one of a user-defined setting and a group administrator-defined setting via one or more user interfaces for a user or group administrator to select one or more of the set of suggested reactive emoji.

In some embodiments, provided is a non-transitory computer-readable storage medium storing one or more programs, the one or more programs comprising instructions, which when executed by one or more processors of an electronic device associated with a user of a group-based communication platform, cause the electronic device to: display a message within an interface of a group-based communication platform on a device associated with a user of the group-based communication platform; determine a set of suggested reactive emoji based on a group identifier and a user identifier, wherein the set of suggested reactive emoji is determined based on at least one adjustable setting associated with at least one of the user identifier and the group identifier; receive, from the user, an input associated with the message; and in response to receiving the input, display a menu of message-related actions in the interface, the menu of message-related actions comprising: a first graphical object that is selectable for accessing a plurality of available reactive emoji, and the set of suggested reactive emoji; receive a user selection of a reactive emoji from set of suggested reactive emoji; and display the selected reactive emoji in association with the message within the interface.

In some embodiments of the non-transitory computer-readable storage medium, the at least one adjustable setting comprises at least one of a user-defined setting and a group administrator-defined setting.

In some embodiments of the non-transitory computer-readable storage medium, the at least one adjustable setting comprises a user-defined setting and a group administrator-defined setting and the user-defined setting takes precedence over the administrator-defined setting.

In some embodiments of the non-transitory computer-readable storage medium, the set of suggested reactive emoji is determined based on a history of usage of reactive emoji.

In some embodiments of the non-transitory computer-readable storage medium, the history of usage of reactive emoji is a frequency of usage of reactive emoji.

In some embodiments of the non-transitory computer-readable storage medium, the history of usage of reactive emoji is a total number of times the user has used a reactive emoji of any kind.

In some embodiments of the non-transitory computer-readable storage medium, the at least one adjustable setting is set by at least one of a user-defined setting and a group administrator-defined setting via one or more user interfaces for a user or group administrator to select one or more of the set of suggested reactive emoji.

DESCRIPTION OF FIGURES

The invention will now be described, by way of example only, with reference to the accompanying drawings, in which:

FIG. 3A-3C illustrates aspects of a user interface for reacting to a message, according to some embodiments;

DETAILED DESCRIPTION

Figure 1:
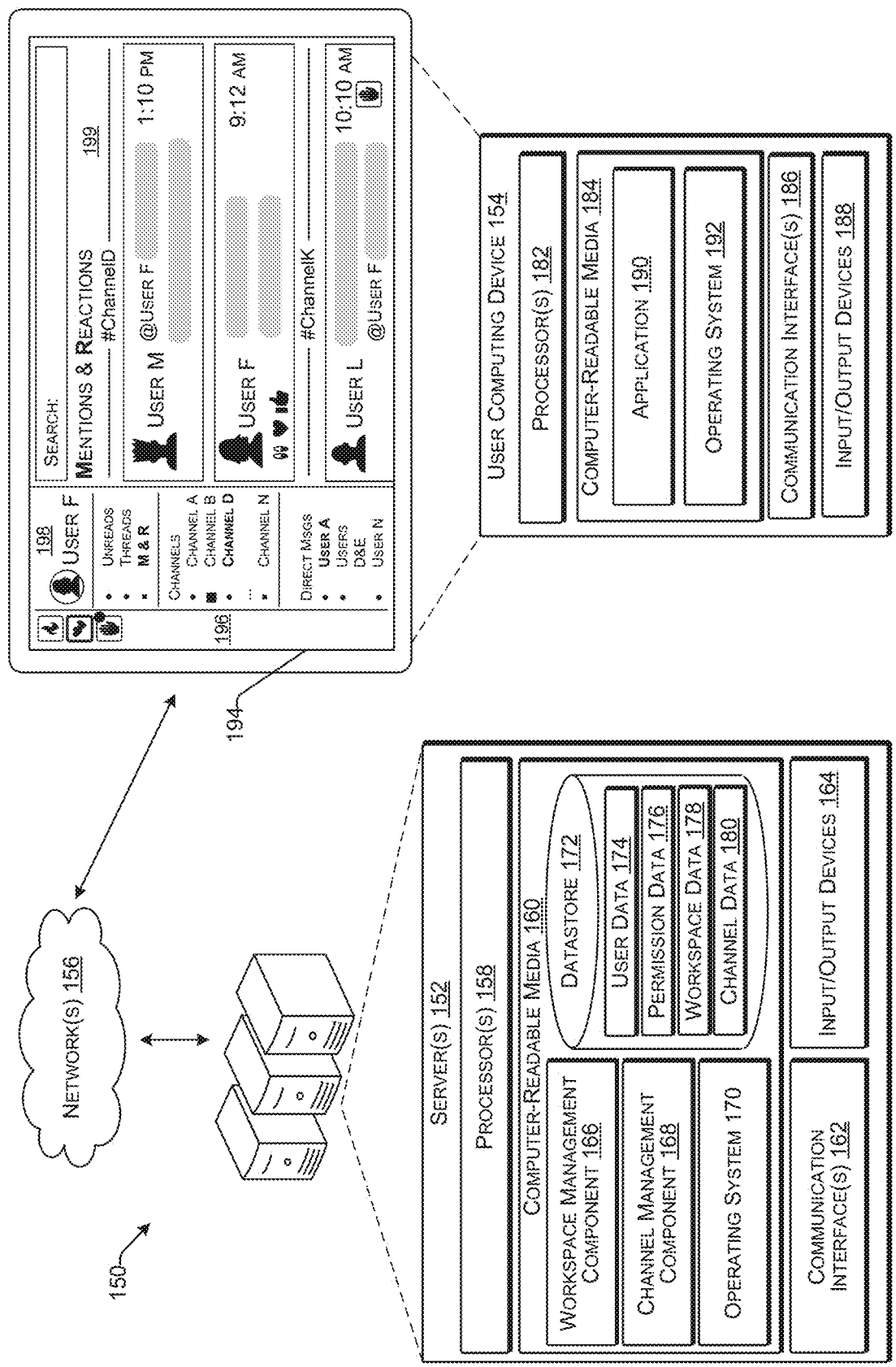
FIG. 1 illustrates a communication system, according to some embodiments.

According to various embodiments, systems and methods described herein provide a set of suggested reactive emoji from which a user can select for responding to a message in a group-based communication. According to various embodiments, the reactive emoji included in the set of suggested reactive emoji can be customized by a user and/or administrator of a group to customize the user and/or group experience. Thus, the systems and method described herein, according to various embodiments, provide a simplified and intuitive way for users to react to messages in a group-based communication platform using reactive emoji in a way that can be customized to the user and/or group.

According to various embodiments, a message action menu that includes one or more suggested reactive emoji is displayed in association with a message in a group-based communication interface, such as in response to a user click or hover associated with the message. The user can easily react to the message by selecting a suggested reactive emoji without having to navigate through additional menus. Upon receiving a user selection of an emoji from the message actions menu, the emoji can be displayed as a reaction in a reaction area of the interface. In some embodiments, a group administrator can customize the specific suggested reactive emoji that are included in the message actions menu for users responding to a message associated with the group. This can help create a group experience tailored to the group by encouraging users to use specific reactive emoji. In some embodiments, a user can customize the specific reactive emoji that are provided in the message actions menu, so that, for example, the user's preferred and/or most commonly used reactive emoji are provided as suggestions.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1 illustrates an example environment 150 for performing techniques described herein. In at least one example, the example environment 150 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 150 can include one or more server computing devices (or "server(s)") 152. In at least one example, the server(s) 152 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 152 can communicate with a user computing device 154 via one or more network(s) 156. That is, the server(s) 152 and the user computing device 154 can transmit, receive, and/or store data (e.g., content, information, or the like) using the network(s) 156, as described herein. The user computing device 154 can be any suitable type of computing device, e.g., portable, semi-portable, semi-stationary, or stationary. Some examples of the user computing device 154 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 154 is shown, in practice, the example environment 150 can include multiple (e.g., tens of, hundreds of, thousands of, millions of) user computing devices. In at least one example, user computing devices, such as the user computing device 154, can be operable by users to, among other things, access communication services via the communication platform. A user can be an individual, a group of individuals, an employer, an enterprise, an organization, or the like.

The network(s) 156 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 156 are well known and are not discussed herein in detail.

In at least one example, the server(s) 152 can include one or more processors 158, computer-readable media 160, one or more communication interfaces 162, and input/output devices 164.

In at least one example, each processor of the processor(s) 158 can be a single processing unit or multiple processing units, and can include single or multiple computing units or multiple processing cores. The processor(s) 158 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 158 can be one or more hardware processors and/or logic circuits of any suitable type specifically programmed or configured to execute the algorithms and processes described herein. The processor(s) 158 can be configured to fetch and execute computer-readable instructions stored in the computer-readable media, which can program the processor(s) to perform the functions described herein.

The computer-readable media 160 can include volatile and nonvolatile memory and/or removable and non-removable media implemented in any type of technology for storage of data, such as computer-readable instructions, data structures, program modules, or other data. Such computer-readable media 160 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 152, the computer-readable media 160 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 160 can be used to store any number of functional components that are executable by the processor(s) 158. In many implementations, these functional components comprise instructions or programs that are executable by the processor(s) 158 and that, when executed, specifically configure the processor(s) 158 to perform the actions attributed above to the server(s) 152.

Functional components stored in the computer-readable media can optionally include a workspace management component 166, a channel management component 168, an operating system 170, and a datastore 172.

In at least one example, the workspace management component 166 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 166 can manage workspace membership. That is, the workspace management component 166 can receive requests to associate users with individual workspaces and the workspace management component 166 can associate user accounts associated with such users with group identifiers associated with the individual workspaces. For example, responsive to receiving a request to add a user to a workspace, the workspace management component 166 can associate a user account of the user with a group identifier of the workspace. The workspace management component 166 can disassociate user accounts and group identifiers, for example, when a user is removed from a workspace.

In at least one example, the workspace management component 166 can manage cross-workspace data integration, as described herein. For example, the workspace management component 166 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 166 can detect updates to data associated with a workspace and can integrate such updated data into user interface(s) presented via user computing device(s) of user(s) associated with the workspace. Similarly, the workspace management component 166 can facilitate cross-workspace operations. For example, the workspace management component 166 can facilitate messages between workspaces, searches between or across multiple workspaces, and the like. Additional details of operations that can be performed by the workspace management component 166 are described below.

In at least one example, the channel management component 168 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 168 can establish a communication channel between and among various user computing devices, allowing the user computing devices to communicate and share data between and among each other. In at least one example, the channel management component 168 can manage such communications and/or sharing of data. In some examples, data associated with a communication channel can be presented via a user interface. In at least one example, the channel management component 168 can interact with the workspace management component 166 to manage the generation, presentation, and/or updating of user interfaces. Additional details of operations that can be performed by the channel management component 168 are described below.

In at least one example, the operating system 170 can manage the processor(s) 158, computer-readable media 160, hardware, software, etc. of the server(s) 152.

In at least one example, the datastore 172 can be configured to store data that is accessible, manageable, and updatable. In some examples, the datastore 172 can be integrated with the server(s) 152, as shown in FIG. 1. In other examples, the datastore 172 can be located remotely from the server(s) 152 and can be accessible to the server(s) 152 and/or user device(s), such as the user device 154. The datastore 172 can comprise multiple databases, which can include user data 174, permission data 176, workspace data 178, and channel data 180. Additional or alternative data may be stored in the data store and/or one or more other data stores.

In at least one example, the user data 174 can store data associated with users of the communication platform. In at least one example, the user data 174 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emoji, a plurality of conversations, a plurality of conversation topics, an avatar, an email address, a real name (e.g., John Doe), a username (e.g., j doe), a password, a time zone, a status, a token, and the like.

In at least one example, the permission data 176 can store data associated with permissions of individual users of the communication platform. In some examples, permissions can be set automatically or by a group administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 174. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the workspace data 178 can store data associated with individual workspaces. As described above, the communication platform can be partitioned into workspaces associated with groups of users. In at least one example, a group identifier can be associated with a workspace. In at least one example, the group identifier can indicate a physical address in the workspace data 178 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 172 (e.g., the user data 174, the permission data 176, the channel data 180, etc.).

In at least one example, the channel data 180 can store data associated with individual communication channels. In at least one example, the channel management component 168 can establish a communication channel between and among various user computing devices, allowing the user computing devices to communicate and share data between and among each other. In at least one example, a communication channel identification may be assigned to a communication channel, which indicates the physical address in the channel data 180 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 172 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 172 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 172 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 172 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 172 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 162 can include one or more interfaces and hardware components for enabling communication with various other devices (e.g., the user computing device 154), such as over the network(s) 156 or directly. In some examples, the communication interface(s) 162 can facilitate communication via Websockets, Application Programming Interfaces (APIs) (e.g., using API calls), HypterText Transfer Protocols (HTTPs), etc.

The server(s) 152 can further be equipped with various input/output devices 164 (e.g., I/O devices). Such I/O devices 164 can include a display, various user interface controls (e.g., buttons, joystick, keyboard, mouse, touch screen, etc.), audio speakers, connection ports and so forth.

In at least one example, the user computing device 154 can include one or more processors 182, computer-readable media 184, one or more communication interfaces 186, and input/output devices 188.

In at least one example, each processor of the processor(s) 182 can be a single processing unit or multiple processing units, and can include single or multiple computing units or multiple processing cores. The processor(s) 182 can comprise any of the types of processors described above with reference to the processor(s) 158 and may be the same as or different than the processor(s) 158.

The computer-readable media 184 can comprise any of the types of computer-readable media 184 described above with reference to the computer-readable media 160 and may be the same as or different than the computer-readable media 160. Functional components stored in the computer-readable media can optionally include at least one application 190 and an operating system 192.

In at least one example, the application 190 can be a mobile application, a web application, or a desktop application, which can be provided by the communication platform or which can be an otherwise dedicated application. In some examples, individual user computing devices associated with the environment 150 can have an instance or versioned instance of the application 190, which can be downloaded from an application store, accessible via the Internet, or otherwise executable by the processor(s) 182 to perform operations as described herein. That is, the application 190 can be an access point, enabling the user computing device 154 to interact with the server(s) 152 to access and/or use communication services available via the communication platform. In at least one example, the application 190 can facilitate the exchange of data between and among various other user computing devices, for example via the server(s) 152. In at least one example, the application 190 can present user interfaces, as described herein. In at least one example, a user can interact with the user interfaces via touch input, keyboard input, mouse input, spoken input, or any other type of input.

A non-limiting example of a user interface 194 is shown in FIG. 1. As illustrated in FIG. 1, the user interface 194 can present data associated with one or more communication channels and, in some examples, one or more workspaces. That is, in some examples, the user interface can integrate data from multiple workspaces into a single user interface so that the user (e.g., of the user computing device 154) can access and/or interact with data associated with the multiple workspaces that he or she is associated with and/or otherwise communicate with other users associated with the multiple workspaces. In some examples, the user interface 194 can include a first region 196, or pane, that includes indicator(s) (e.g., user interface element(s) or object(s)) associated with workspace(s) with which the user (e.g., account of the user) is associated. In some examples, the user interface 194 can include a second region 198, or pane, that includes indicator(s) (e.g., user interface element(s) or object(s)) representing data associated with the workspace(s) with which the user (e.g., account of the user) is associated. Additional details associated with the second region 198 and indicator(s) are described below with reference to FIG. 2.

In at least one example, the user interface 194 can include a third region 199, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 199 can be associated with the same or different workspaces. That is, in some examples, the third region 199 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 199 presents data associated with multiple workspaces, at least some data can be associated with an indication of which workspace the data is associated with. Additional details associated with the user interface 194, and the third region 199, are described below with reference to FIG. 2.

In at least one example, the operating system 192 can manage the processor(s) 182, computer-readable media 184, hardware, software, etc. of the server(s) 152.

The communication interface(s) 186 can include one or more interfaces and hardware components for enabling communication with various other devices (e.g., the user computing device 154), such as over the network(s) 156 or directly. In some examples, the communication interface(s) 186 can facilitate communication via Websockets, APIs (e.g., using API calls), HTTPs, etc.

The user computing device 154 can further be equipped with various input/output devices 188 (e.g., I/O devices). Such I/O devices 188 can include a display, various user interface controls (e.g., buttons, joystick, keyboard, mouse, touch screen, etc.), audio speakers, connection ports and so forth.

While techniques described herein are described as being performed by the workspace management component 166, the channel management component 168, and the application 190, techniques described herein can be performed by any other component, or combination of components, which can be associated with the server(s) 152, the user computing device 154, or a combination thereof.

Figure 2:
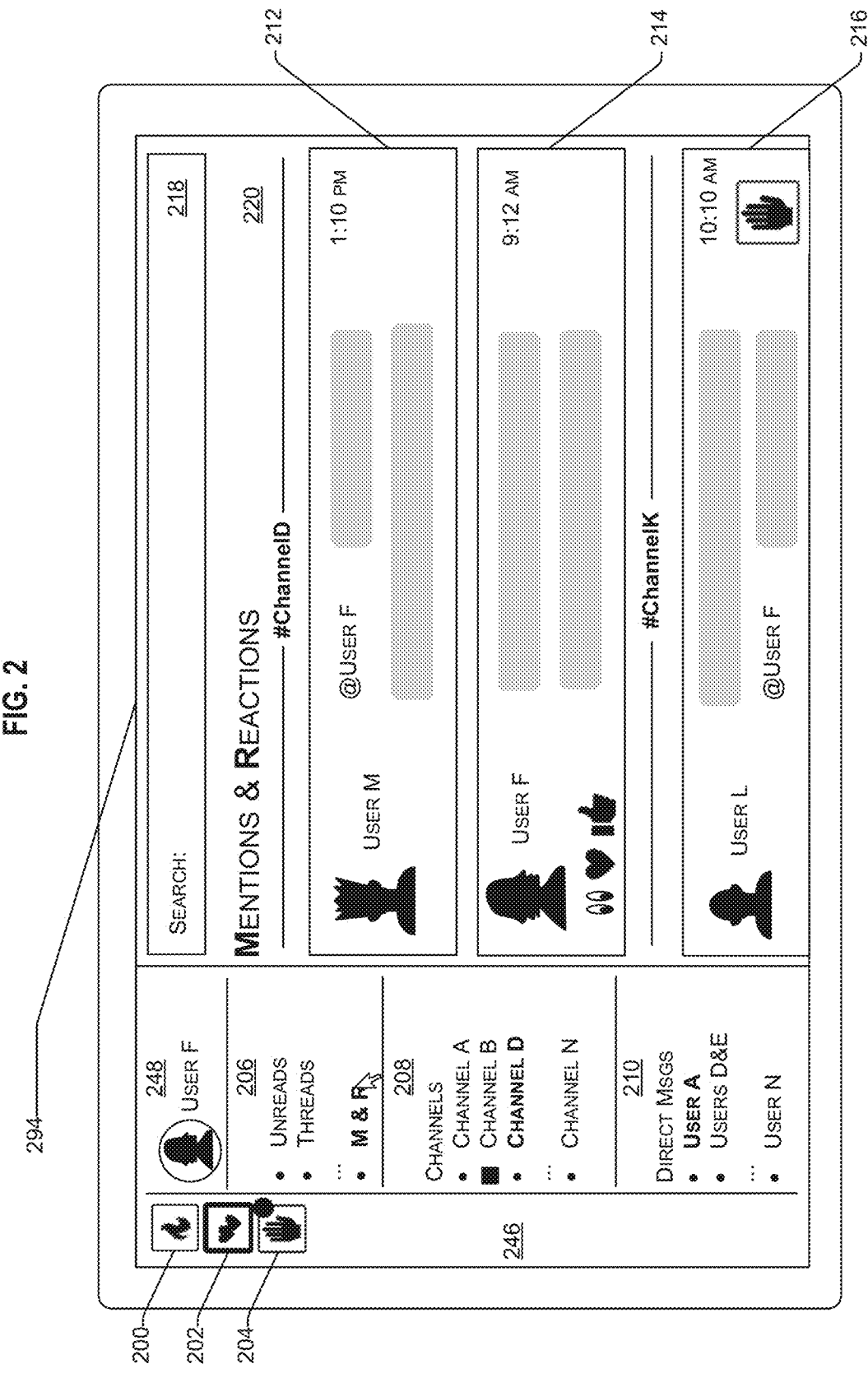
FIG. 2 illustrates a user interface of a group-based communication system, according to some embodiments.

FIG. 2 illustrates additional details associated with the user interface 294 that presents data associated with multiple workspaces, as described above with reference to FIG. 1. User interfaces, such as user interface 194 of FIG. 1 and user interface 294 of FIG. 2, can include features that suggest to a particular user one or more emoji for reacting to a message (emoji provided as a reaction to a message are also referred to herein as "reactive emoji"). For example, a user may utilize a reactive emoji to react to a message in a workspace of a communication system.

As described above, in at least one example, the user interface 294 can include a first region 246, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 246. In at least one example, a user account of the user (e.g., User F) can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces.

Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 246. In some examples, some of the indicators associated with all of the workspaces with which a user is associated can be presented via the first region 246 and the user can interact with the user interface 294 to view additional or alternative indicators. In examples where fewer than all workspaces are represented via the user interface 294, the indicators can be arranged in alphabetical order, in an order of most recent interaction, in an order based on most frequent interaction, or some other order.

In some examples, the first region 246 may not be included in the user interface 294, and such information can be integrated into the user interface 294 via additional or alternative mechanisms.

In some examples, the user interface 294 can include a second region 248, or pane, that includes indicator(s) (e.g., user interface element(s) or object(s)) representing virtual space(s) associated with the workspace(s) with which the user (e.g., account of the user) is associated. In at least one example, the second region 248 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism such that when actuated, can cause the application 140 to present data associated with the corresponding virtual space via the third region 220. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 220, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second region 248 of the user interface 294 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 294 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 294. In some examples, communication channels associated with different workspaces can be in different sections of the second sub-section 208, or can have their own regions or panes in the user interface 294.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 294. In such examples, the user may navigate to a different interface (not shown) to browse additional channels that are accessible to the user but to which the user is not currently a member.

In addition to the second sub-section 208, the second region 248 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

As described above, in at least one example, the user interface 294 can include a third region 220, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 220 can be associated with the same or different workspaces. That is, in some examples, the third region 220 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 220 presents data associated with multiple workspaces, at least some data can be associated with an indication of which workspace the data is associated with.

For example, in FIG. 2, the user (e.g., User F), can interact with the user interface 294 to view data associated with the virtual space corresponding to "mentions and reactions." In FIG. 2, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user (e.g., User F) in a message, represented by the indicator 212 (e.g., a user interface element, object, etc.), which is associated with a communication channel (e.g., #ChannelD). The user (e.g., User F) also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 220. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user (e.g., User F) in a message, represented by the indicator 216 (e.g., a user interface element or object), which is associated with a communication channel (e.g., #ChannelK). As such, the indicator 216 can be presented in the third region 220. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 220 of the user interface 294 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 220 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 294 can include a search mechanism 218, wherein a user can input a search term and the server(s) 152 (of FIG. 1) can perform a search associated with the communication platform. In some examples, the search can be performed across each workspace with which the user is associated, or the search can be restricted to a particular workspace, based on a user specification.

The user interface 294 is a non-limiting example of a user interface that can be presented via the user computing device 154 (e.g., by the application 190) of FIG. 1. In some examples, the application 190 can receive data from the workspace management component 166 and/or channel management component 168 and the application 190 can generate and present the user interface 194 based on the data. In other examples, the application 190 can receive data from the channel management component 168 and instructions for generating the user interface 194 from the workspace management component 166 and/or channel management component 168. In such an example, the application 190 can present the user interface 194 based on the instructions. Additional or alternative data can be presented via a user interface and additional or alternative configurations can be imagined.

Figure 3A:
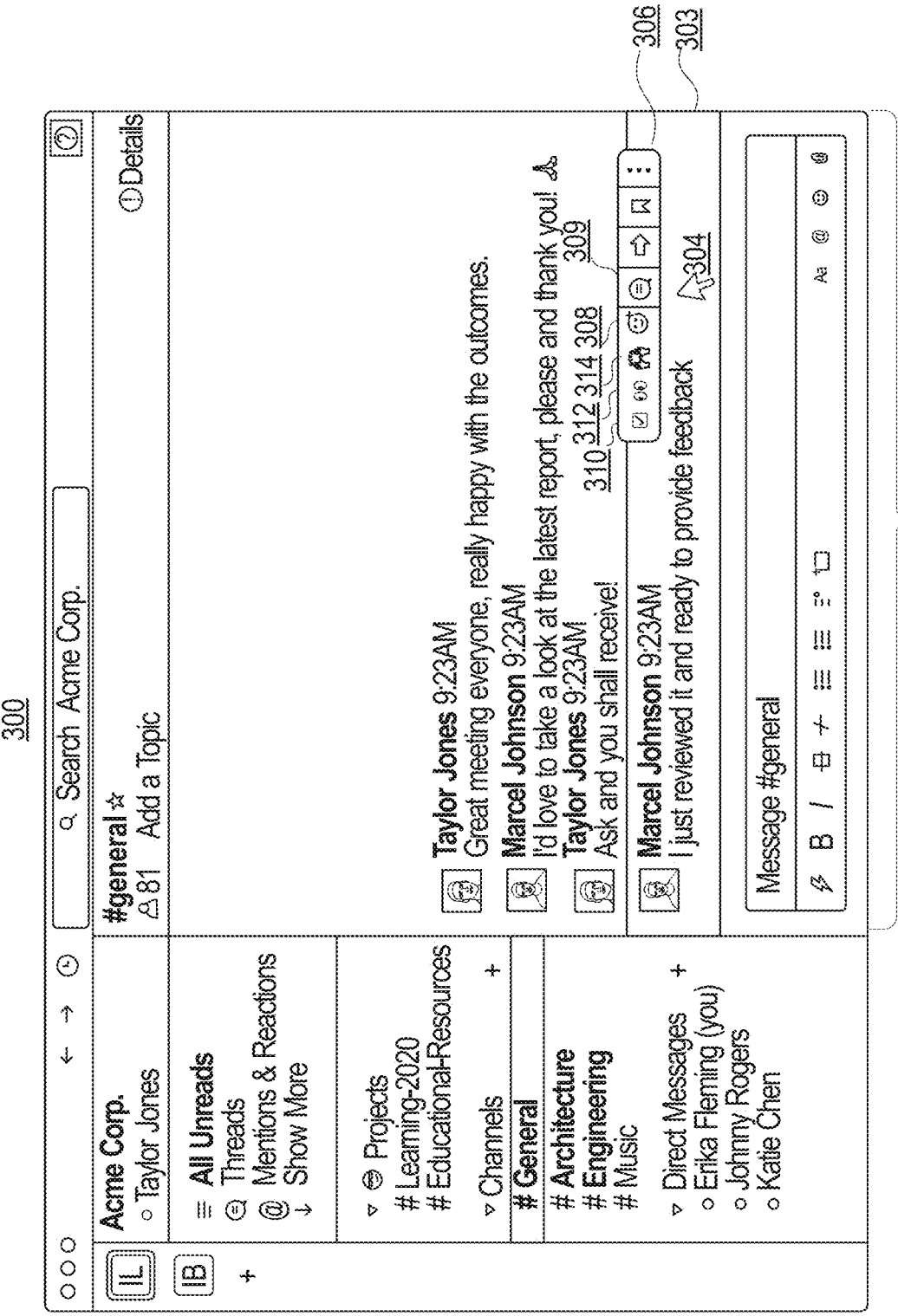
Figure 3B:
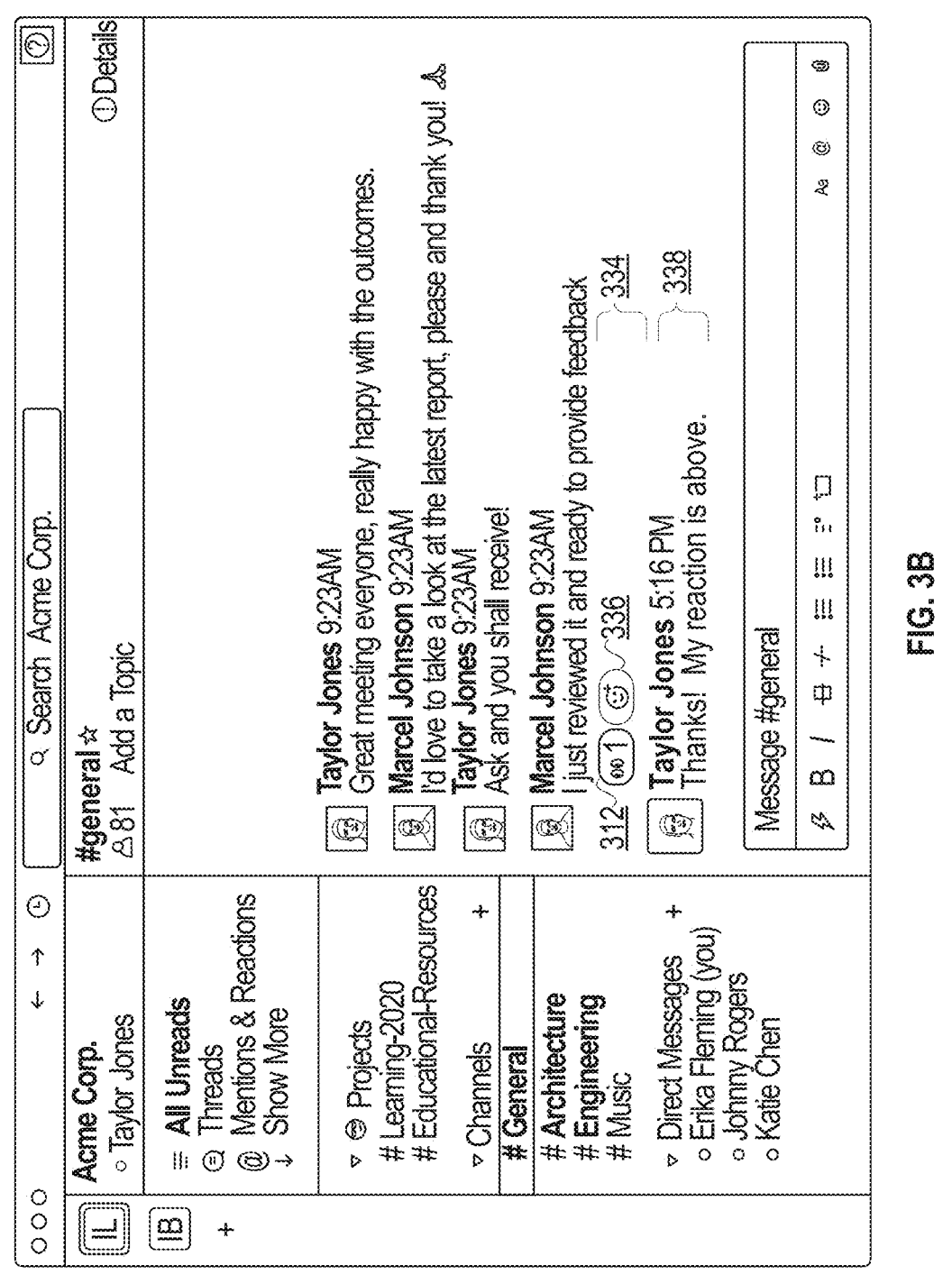
Figure 3C:
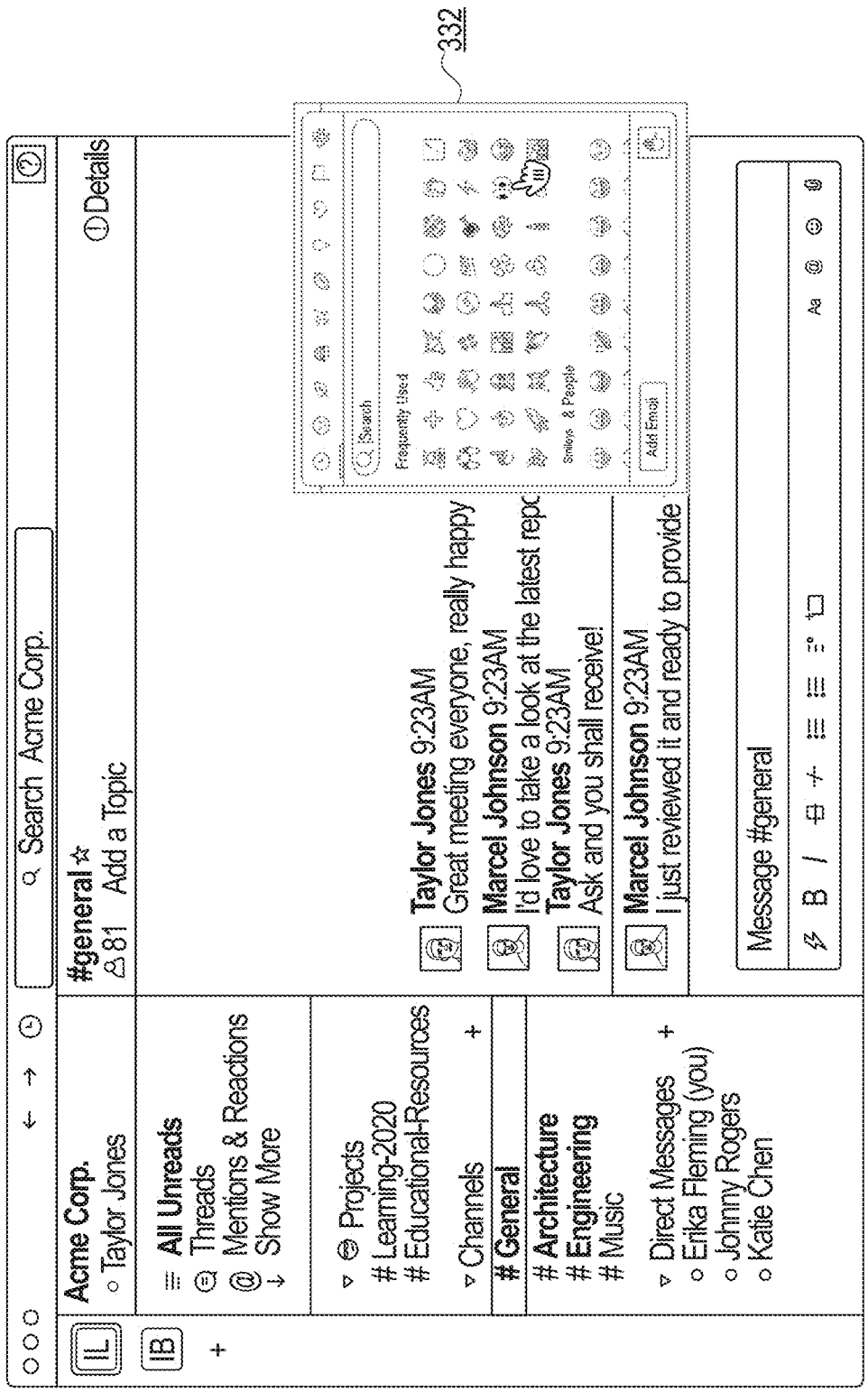

FIGS. 3A-C illustrate exemplary techniques including exemplary user interfaces ("UI") for reacting to a message, in accordance with some embodiments. The user interfaces can be displayed at one or more electronic devices of one or more users of a group-based communication platform. The electronic device can be a client device or user device of the group-based communication system. The client device can be a desktop computer, a laptop computer, a smartphone, a netbook, a tablet computer, a wearable device, etc. The client device is in communication with one or more servers of the group-based communication system, as described in detail herein. FIG. 3A illustrates an exemplary user interface 300 for suggesting reactive emoji to a user according to some embodiments. User interface 300 can include any of the features discussed above with respect to interface 144 and the discussion of those features is not repeated for brevity. Interface 300 includes a message display region 302 that can display one or more messages from one or more users associated with a workspace of a group, as discussed above with respect to interface 144. As depicted, upon a user selection of a given message 303 (e.g., via a mouse hover input indicated by cursor 304) in the message display region 302, a message action menu 306 may be displayed.

According to various embodiments, the message action menu 306 includes a set of suggested emoji 310-314, which in the example of FIG. 3A includes three suggested emoji—check emoji 310, eyes emoji 312, and high-five emoji 314. The set of suggested emoji can include as few as a single suggested emoji and can include any number of multiple suggested emoji, such as two, three, four, five, six, seven, eight, nine, ten, twelve, fifteen, eighteen, or twenty suggested reactive emoji for a user to select (or "one-click") to react to a message or other media. According to various embodiments, the number of suggested emoji provided in menu 306 may be customized by a group administrator or a user.

In some embodiments, the group-based communication system may use an algorithm to determine which emoji of a full collection of emoji should be the suggested reactive emoji. In some embodiments, the suggested reactive emoji may be determined based on a history of usage of reactive emoji. The history of usage may be based on the history of a singular user or a plurality of users in a particular group (e.g., channel, workspace, team). In some embodiments, the history of usage of reactive emoji may be based on a frequency of usage of reactive emoji. This frequency of usage of reactive emoji may be based on that of a singular user or a plurality of users in a particular group (e.g., channel, workspace, team). In some embodiments, the history of usage of reactive emoji is a total number of times a singular user has used a reactive emoji of any kind. In some embodiments, the history of usage of reactive emoji is a total number of times a plurality of users have used a reactive emoji of any kind. In some embodiments, an emoji that has been previously included in the set of reactive emoji may be removed from the set based on an infrequency of usage of the reactive emoji. In some embodiments, the infrequently used (e.g., rarely or never used in a given time period) reactive emoji may be removed from the set and replaced with a different reactive emoji or not replaced such that the set of suggested reactive emoji has fewer suggested reactive emoji.

In some embodiments, a user may customize the suggested emoji for himself or herself. This customization may enable a user to be provided with one-click options based on a user's favorite emoji, a user's most frequently-used emoji, and/or the nature of the user's role in the particular workspace (e.g., a manager may use certain emoji more frequently than an individual contributor or non-manager). In some embodiments, a group administrator can customize the suggested emoji for a particular group or workspace (e.g., based on a group identifier). For example, a group administrator may customize the suggested emoji based on the content of a particular workspace and/or based on reactions the group administrator may wish to encourage from its users. In some embodiments, the suggested emoji may be customized by both a group administrator and a user. For example, a group administrator may customize the default suggested reactive emoji that are provided to a user, and a user may then choose to customize, or change, the default suggested emoji. In some embodiments, a group administrator may customize the suggested reactive emoji and "lock" one or more of the suggested reactive emoji such that the locked one or more suggested reactive emoji are not customizable by a user. In some embodiments, user customization of the suggested reactive emoji may override any administrator customization. The customized suggested reactive emoji may be selected from any one of the available emoji from the collection of emoji.

In response to a user selection of a suggested reactive emoji from the menu 306, the emoji is displayed as a reaction to the message. For example, with reference to FIG. 3B, supposing the user selected the eyes reactive emoji 312, emoji 312 is shown in a reaction area 334 as a reaction to the message.

According to various embodiments, the user may decide not to select one of the suggested reactive emoji and can access a fuller set of reactive emoji via affordance 308 of menu 306 as illustrated in FIG. 3C. Upon a user selection of the user affordance 308, the electronic device may display an emoji menu 332. The emoji menu 332 comprises one or more collections of emoji, such as a collection of frequently used emoji (frequency of usage by the user above a predefined threshold), a collection of favorite emoji (e.g., as previously specified by the user), and a collection of emoji directed to a topic (e.g., "Smileys and People").

In response to a user selection of an emoji in the menu 332, the selected emoji is displayed as a reaction to the message (emoji provided as a reaction to a message are also referred to herein as "reactive emoji"), such as in reaction area 334 of FIG. 3B. In the depicted example, an icon 336 is displayed in the reaction area to provide a second entry point to menu 332 as shown in FIG. 3B.

According to some embodiments, a user may respond to a message by composing a new message. For example, upon a user selection of the user affordance 309, a user can compose a new message as a response to the selected message 303, which can comprise one or more text strings, images, emoji, and attachments. A response to the selected message can be displayed in the message display region 302. For example, with reference to FIG. 3B, the response ("Thanks! My reaction is above.") is shown in a response area 338 as a response to the message. The reaction area 334 and the response area 338, as shown in FIG. 3B, may be two distinct areas.

In some embodiments, the suggested reactive emoji (e.g., check emoji 310, eyes emoji 312, or high-five emoji 314) provided in menu 306 may be customizable. The suggested reactive emoji may include any selection of reactive emoji from a full collection of reactive emoji (e.g., the full collection of reactive emoji depicted in menu 332 of FIG. 3B). In some embodiments, a group administrator may customize the suggested reactive emoji. In some embodiments, a user may customize the suggested reactive emoji through the user interfaces of FIGS. 4-5. In some embodiments, both a group administrator and a user may customize the suggested reactive emoji. User customization may override group administrator customization.

In some embodiments, the suggested reactive emoji may only be provided in menu 306 under certain circumstances. For example, a default set of suggested reactive emoji may be provided to a user for only a predetermined amount of time. Once this predetermined amount of time has passed, the suggested reactive emoji are no longer provided in menu 306. For example, the suggested reactive emoji may be provided only to new users for a predetermined time period of two weeks. Once a new user has been using the group-based communication system for longer than two weeks, the suggested reactive emoji may no longer be provided. In this case, the user may then need to manually turn them back on, or utilize the full collection of reactive emoji (e.g., as shown in menu 332 of FIG. 3C) to select an emoji to react to a message or other media. In some embodiments, the predetermined amount of time may be measured by the number of uses. For example, the suggested reactive emoji may no longer be provided once a user successfully uses the suggested reactive emoji a certain number times. In this case, the suggested reactive emoji in menu 306 may be used specifically to help get a new user accustomed to using reactive emoji to react to a message. Once the user has demonstrated that he or she is capable of using emoji to react to a message (e.g., by selecting one of the suggested reactive emoji on ten different occasions), the suggested emoji may no longer be provided to the user. The user will then need to manually turn the suggested reactive emoji feature back on (i.e., via user customization) or select the user affordance from menu 306 that provides to the user the full collection of emoji (see FIG. 3C) to use emoji to react to a message. In some embodiments, the suggested reactive emoji may no longer be provided once a user bypasses the suggested reactive emoji a certain number of times. For example, a user may choose not to select any of the suggested reactive emoji, and may instead select user affordance 308 from menu 306 to select an emoji from the full collection of reactive emoji. In this case, once the user has reacted to a message using a reactive emoji from the full collection of reactive emoji (i.e., bypassing the suggested reactive emoji by not selecting any of them) a certain number of times (e.g., ten times), one or more of the suggested reactive emoji may no longer be provided to the user in menu 306. Here, the user has demonstrated that he or she does not want to use any of the suggested reactive emoji, and would, for whatever reason, prefer to select the user affordance to open the full collection of reactive emoji each time he or she wants to react to a message using a reactive emoji. The user will then need to manually turn the suggested reactive emoji feature back on (i.e., via user customization) if he or she wants to use the suggested reactive emoji feature.

The techniques described herein are not limited to reacting to messages. Rather, according to various embodiments, the techniques can be used for reacting to any other posting in a group-based communication platform. Examples of other postings that can be reacted to according to the principles described herein include other types of media like a posted video, a posted document, a posted audio file, streaming audio and/or video, and asynchronous media like an ephemeral story.

Figure 4:
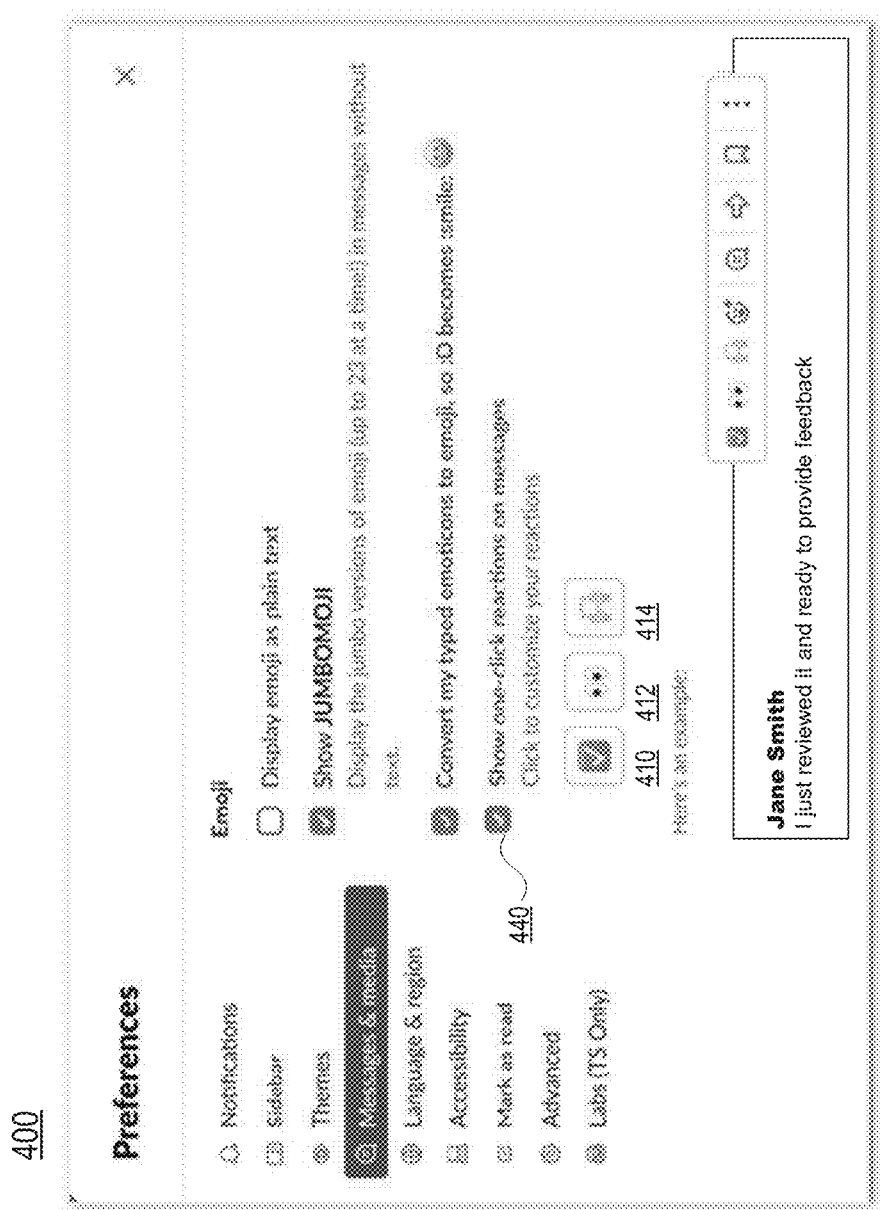
FIG. 4 illustrates a user interface that can be used by a user for customizing the suggested reactive emoji, according to some embodiments.

According to various embodiments, the set of suggested reactive emoji can be customized by the user and/or by a group administrator. FIG. 4 shows a user interface 400 that can be used by a user for customizing the suggested reactive emoji. According to some embodiments, a user can choose to activate reactive emoji suggestions in message action menu 306 (i.e., one-click reactions) by selecting user affordance 440. When user affordance 440 is selected, the suggested reactive emoji can be provided to the user in the message action menu 306. When user affordance 440 is not selected, the suggested reactive emoji will not be displayed in the message action menu 306.

User interface 400 shows three suggested reactive emoji that have been customized by the user in this particular example, but any suitable number of suggested reactive emoji options may be provided. Check emoji 410, eyes emoji 412, and high-five emoji 414 have each been selected by the user. These three selected emoji will be provided as suggested reactive emoji in the message actions menu 306 each time the user provides a user input to react to a message in the group-based communication system.

To change one of the three suggested emoji shown in user interface 400, the user can select the reactive emoji that he or she wishes to customize. For example, if the user wants to customize, or change, check emoji 410, the user can select it. In response to selecting check emoji 410, the user can be provided with a menu of a full collection of emoji (such as menu 332 of FIG. 3C). The user may then select which emoji of the full collection of emoji he or she wishes to replace check emoji 410. In some embodiments, the user may be able to remove suggested reactive emoji (such that only one or two emoji are provided as suggested reactive emoji). In some embodiments, the user may be able to add suggested reactive emoji (such that four or more emoji are provided as suggested reactive emoji).

In some embodiments, any customization completed by a user (e.g., through a user interface such as the user interface of FIG. 4) overrides any customization completed by a group administrator, as discussed further below. In some embodiments, a user may only be able to customize one or more of the suggested reactive emoji (i.e., one or more suggested reactive emoji may be "locked" by the group administrator or non-customizable by the user). A user may be able to turn off the suggested reactive emoji entirely, or customize when they are provided (i.e., the suggested reactive emoji only being presented under certain circumstances). For example, a user may choose to only have suggested reactive emoji in certain channels or within certain workspaces. In some embodiments, a user may customize the number of suggested reactive emoji.

A user may customize his or her suggested reactive emoji based on various criteria. For example, a particular user may customize his or her suggested reactive emoji based on preferences alone (e.g., a user may prefer to use a "thumbs up" emoji to convey a job well done to a message author instead of a "high-five" emoji). A user may customize his or her suggested reactive emoji based on his or her role in the group. For example, the user may serve in a leadership position that requires supervising or managing others. In this case, the user may choose to customize his or her suggested reactive emoji based on frequent reactions used in that role (e.g., emoji that convey "I am looking into this", "I agree", "Good idea", "Let's rethink this strategy").

Figure 5:
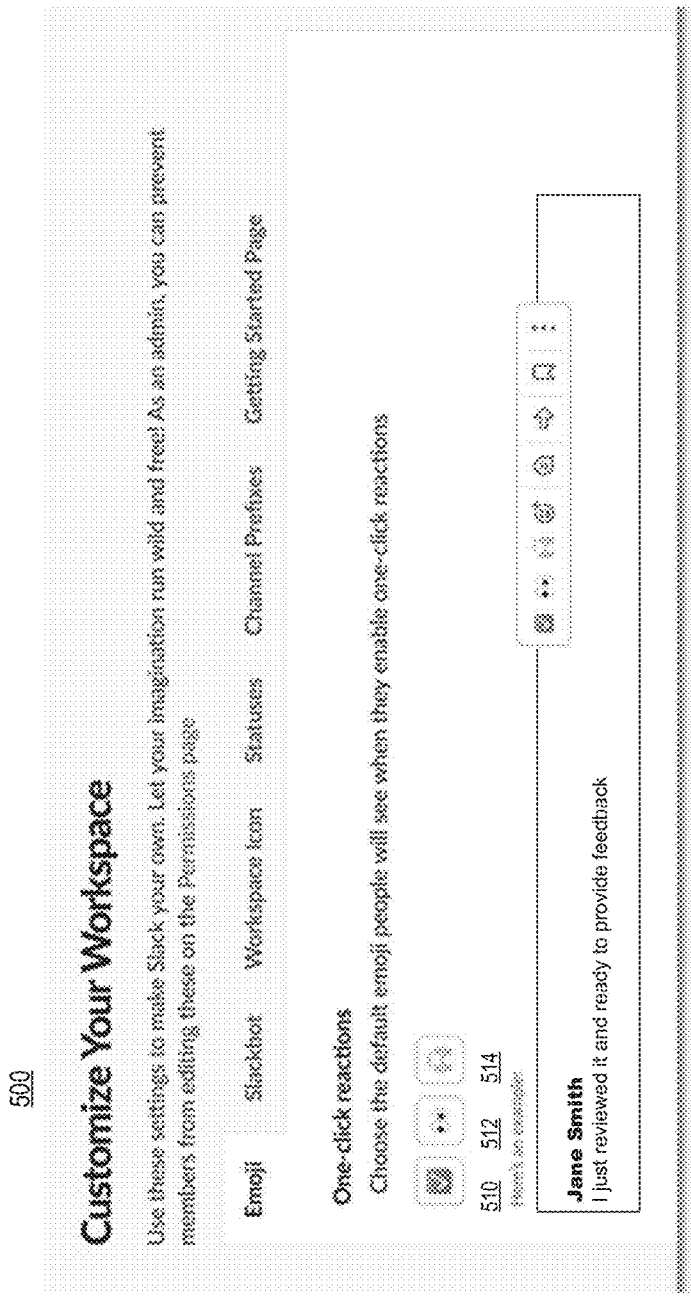
FIG. 5 illustrates a user interface that can be used by a group administrator for customizing the suggested reactive emoji, according to some embodiments.

FIG. 5 shows a user interface 500 that can be used by a group administrator for customizing the suggested reactive emoji that are provided in a message actions menu (e.g., menu 306 of FIG. 3A). As shown, a group administrator can choose the default suggested reactive emoji (i.e., one-click reactions). In some embodiments, any customization completed by the user (e.g., via user interface 400 of FIG. 4) may take precedence over the customization of the group administrator. In other embodiments, any group administrator customization may override a user customization. In some embodiments, a group administrator may define some but less than all of the suggested emoji for the group, such as by leaving one or more of the suggested emoji slots blank in the interface 500.

To customize, or change, any one or more of the default suggested reactive emoji, the group administrator may select any of the three reactive emoji shown in user interface 500. In some embodiments, the group administrator may select any number of reactive emoji to customize. For example, the group administrator may select check emoji 510. Selecting the emoji will provide to the group administrator a full collection of emoji that may be selected from to replace check emoji 510. In some embodiments, the group administrator may be able to remove suggested reactive emoji (such that only one or two emoji are provided as suggested reactive emoji). In some embodiments, the group administrator may be able to add suggested reactive emoji (such that four or more emoji are provided as suggested reactive emoji).

In some embodiments, a group administrator may wish to select reactive emoji that align with the group culture and/or type of content. In some embodiments, a group administrator may select specific reactive emoji that encourage collaboration and/or streamline communication and workflow. For example, check emoji 510 may be used to indicate that a task has been completed. Check emoji 510 could also be used to indicate that a user has seen a message and/or addressed an action item presented in a particular message. Eyes emoji 512 may be used to indicate that a user is looking into the message (e.g., researching the answer to a posed question, working on a request/task). High-five emoji 514 may be used to indicate a job well done, or congratulations. In some embodiments, a group administrator may select emoji that communicate agreement, disagreement, yes, no, indifference, or any other reaction. In some embodiments, a group administrator may customize the suggested reactive emoji for different classes of users. For example, all users in a managerial role may have a first plurality of reactive emoji provided as suggested reactive emoji. All users in an individual contribution role (e.g., non-managerial) may have a second plurality of reactive emoji provided as suggested reactive emoji. In some embodiments, a group administrator may customize the number of suggested reactive emoji.

The emoji available for customization need not be limited to a pre-defined set of emoji. Rather, in some embodiments, a user may select custom emoji from one or more installed emoji packs, which can be user-installed emoji packs, group-administrator installed emoji packs, or a combination of these. In some embodiments, a user may share emoji packs. In some embodiments, an administrator may restrict emoji from custom installed emoji packs, such as by an administrator approval step required before a user can select emoji from a custom installed emoji pack for use as suggestions.

Figure 6:
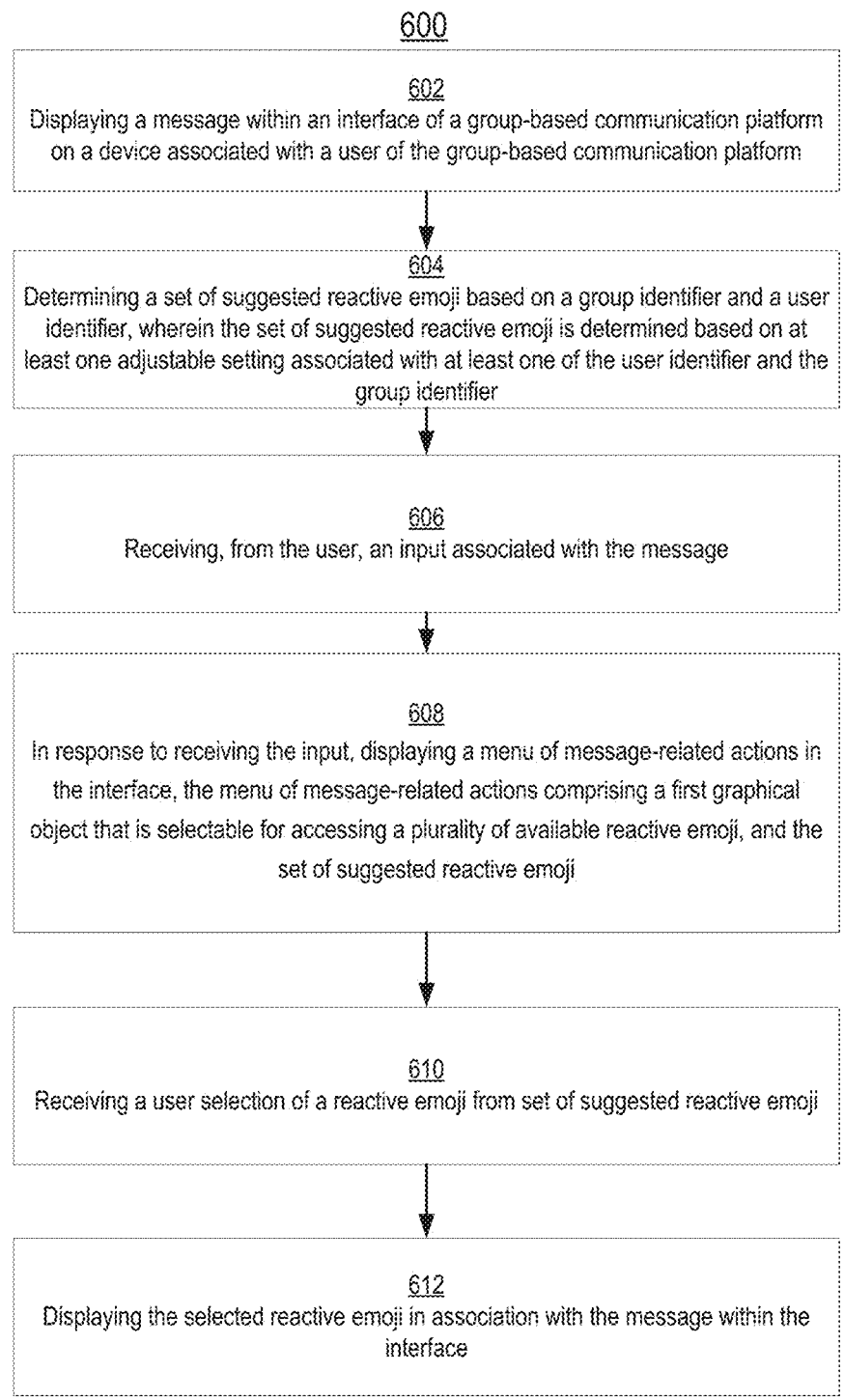
FIG. 6 is a block diagram of a process for reacting to a message using suggested reactive emoji, according to some embodiments.

FIG. 6 illustrates process 600 for reacting to messages, according to some embodiments. Process 600 is performed, for example, using one or more electronic devices implementing a software platform. In some examples, process 600 is performed using a client-server system, and the blocks of process 600 are divided up in any manner between the server and a client device. In other examples, the blocks of process 600 are divided up between the server and multiple client devices. Thus, while portions of process 600 are described herein as being performed by particular devices of a client-server system, it will be appreciated that process 600 is not so limited. In other examples, process 600 is performed using only a client device or only multiple client devices. In process 600, some blocks are, optionally, combined, the order of some blocks is, optionally, changed, and some blocks are, optionally, omitted. In some examples, additional steps may be performed in combination with the process 600. Accordingly, the operations as illustrated (and described in greater detail below) are exemplary by nature and, as such, should not be viewed as limiting.

At step 602, an exemplary system (e.g., one or more electronic devices) displays the message within an interface of a group-based communication platform on a device associated with a user of the group-based communication platform. At step 604, the system determines a set of suggested reactive emoji based on a group identifier and a user identifier. As explained above, a group identifier is associated with identification of a group that comprises a defined set of users in which access to one or more workspaces associated with the group is limited to the defined group of users. A user identifier is associated with identification of a particular user that belongs to the group. The set of suggested reactive emoji is determined based on at least one adjustable setting associated with at least one of the user identifier and the group identifier. Thus, for example, a user and/or group administrator may have defined a set of suggested emoji as discussed above with reference to FIG. 4 and FIG. 5.

At step 606, the system receives, from the user, an input associated with the message. The input can be, for example, a click or hover associated with the message. At step 608, the system, in response to receiving the input, displays a menu of message-related actions (e.g., menu 306 of FIG. 3A) in the interface. The menu of message-related actions comprises a first graphical object that is selectable for accessing a plurality of available reactive emoji (e.g., affordance 308 of FIG. 3A), and the set of suggested reactive emoji (e.g., 310-314 of FIG. 3A). At block 610, the system receives a user selection of a reactive emoji from the set of suggested reactive emoji. At block 612, the system displays the selected reactive emoji in association with the message within the interface.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-implemented method comprising:
displaying a message within an interface of a group-based communication platform on a device associated with a user of the group-based communication platform;
determining a set of suggested reactive emoji based on a group identifier and a user identifier, wherein the set of suggested reactive emoji is determined based on at least one adjustable setting associated with at least one of the user identifier and the group identifier;
receiving, from the user, an input associated with the message;
in response to receiving the input, displaying a menu of message-related actions in the interface, the menu of message-related actions comprising:
a first graphical object that is selectable for accessing a plurality of available reactive emoji, and
the set of suggested reactive emoji;
receiving a user selection of a reactive emoji from the set of suggested reactive emoji; and
displaying the selected reactive emoji in association with the message within the interface.

2. The method of claim 1, where the at least one adjustable setting comprises at least one of a user-defined setting and a group administrator-defined setting.

3. The method of claim 2, wherein the at least one adjustable setting comprises a user-defined setting and a group administrator-defined setting and the user-defined setting takes precedence over the administrator-defined setting.

4. The method of claim 1, wherein the set of suggested reactive emoji is determined based on a history of usage of reactive emoji.

5. The method of claim 4, wherein the history of usage of reactive emoji is a frequency of usage of reactive emoji.

6. The method of claim 4, wherein the history of usage of reactive emoji is a total number of times the user has used a reactive emoji of any kind.

7. The method of claim 1, wherein the at least one adjustable setting is set by at least one of a user-defined setting and a group administrator-defined setting via one or more user interfaces for a user or group administrator to select one or more of the set of suggested reactive emoji.

8. An electronic device associated with a user of a group-based communication platform, comprising:
a display;
one or more processors;
a memory; and
one or more programs, wherein the one or more programs are stored in the memory and configured to be executed by the one or more processors, the one or more programs including instructions for:
displaying a message within an interface of a group-based communication platform on a device associated with a user of the group-based communication platform;
determining a set of suggested reactive emoji based on a group identifier and a user identifier, wherein the set of suggested reactive emoji is determined based on at least one adjustable setting associated with at least one of the user identifier and the group identifier;
receiving, from the user, an input associated with the message;
in response to receiving the input, displaying a menu of message-related actions in the interface, the menu of message-related actions comprising:
a first graphical object that is selectable for accessing a plurality of available reactive emoji, and
the set of suggested reactive emoji;
receiving a user selection of a reactive emoji from the set of suggested reactive emoji; and
displaying the selected reactive emoji in association with the message within the interface.

9. The electronic device of claim 8, where the at least one adjustable setting comprises at least one of a user-defined setting and a group administrator-defined setting.

10. The electronic device of claim 9, wherein the at least one adjustable setting comprises a user-defined setting and a group administrator-defined setting and the user-defined setting takes precedence over the administrator-defined setting.

11. The electronic device of claim 8, wherein the set of suggested reactive emoji is determined based on a history of usage of reactive emoji.

12. The electronic device of claim 11, wherein the history of usage of reactive emoji is a frequency of usage of reactive emoji.

13. The electronic device of claim 11, wherein the history of usage of reactive emoji is a total number of times the user has used a reactive emoji of any kind.

14. The electronic device of claim 8, wherein the at least one adjustable setting is set by at least one of a user-defined setting and a group administrator-defined setting via one or more user interfaces for a user or group administrator to select one or more of the set of suggested reactive emoji.

15. A non-transitory computer-readable storage medium storing one or more programs, the one or more programs comprising instructions, which when executed by one or more processors of an electronic device associated with a user of a group-based communication platform, cause the electronic device to:
- display a message within an interface of a group-based communication platform on a device associated with a user of the group-based communication platform;
- determine a set of suggested reactive emoji based on a group identifier and a user identifier;
- receive, from the user, an input associated with the message;
- in response to receiving the input, display a menu of message-related actions in the interface, the menu of message-related actions comprising:
  - a first graphical object that is selectable for accessing a plurality of available reactive emoji, and
  - the set of suggested reactive emoji, wherein the set of suggested reactive emoji is determined based on at least one adjustable setting associated with at least one of the user identifier and the group identifier;
- receive a user selection of a reactive emoji from the set of suggested reactive emoji; and
- display the selected reactive emoji in association with the message within the interface.

16. The non-transitory computer-readable storage medium of claim 15, where the at least one adjustable setting comprises at least one of a user-defined setting and a group administrator-defined setting.

17. The non-transitory computer-readable storage medium of claim 16, wherein the at least one adjustable setting comprises a user-defined setting and a group administrator-defined setting and the user-defined setting takes precedence over the administrator-defined setting.

18. The non-transitory computer-readable storage medium of claim 15, wherein the set of suggested reactive emoji is determined based on a history of usage of reactive emoji.

19. The non-transitory computer-readable storage medium of claim 18, wherein the history of usage of reactive emoji is a frequency of usage of reactive emoji.

20. The non-transitory computer-readable storage medium of claim 18, wherein the history of usage of reactive emoji is a total number of times the user has used a reactive emoji of any kind.

* * * * *